(12) United States Patent
Gadwale et al.

(10) Patent No.: US 11,902,366 B2
(45) Date of Patent: Feb. 13, 2024

(54) SYSTEM FOR IMPLEMENTING DYNAMIC MULTI-FACTOR SOFT LOCK ON USER IDENTIFIERS

(71) Applicant: BANK OF AMERICA CORPORATION, Charlotte, NC (US)

(72) Inventors: Adithya Gadwale, Falls Church, VA (US); Phanta Danielle Wynn, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 58 days.

(21) Appl. No.: 17/824,360

(22) Filed: May 25, 2022

(65) Prior Publication Data
US 2023/0388375 A1    Nov. 30, 2023

(51) Int. Cl.
| H04L 61/3015 | (2022.01) |
| H04L 67/1074 | (2022.01) |
| H04L 9/40 | (2022.01) |

(52) U.S. Cl.
CPC ...... *H04L 67/1078* (2013.01); *H04L 61/3015* (2013.01); *H04L 63/08* (2013.01); *H04L 63/102* (2013.01); *H04L 63/107* (2013.01)

(58) Field of Classification Search
CPC ... H04L 67/1078; H04L 63/08; H04L 63/102; H04L 63/107
USPC .......................... 709/220, 224, 225, 227, 228
See application file for complete search history.

(56) References Cited

U.S. PATENT DOCUMENTS

| 6,009,412 | A  | 12/1999 | Storey |
| 6,182,894 | B1 | 2/2001  | Hackett |
| 6,748,435 | B1 | 6/2004  | Wang |
| 7,277,010 | B2 | 10/2007 | Joao |
| 7,346,583 | B2 | 3/2008  | Hicks |
| 7,739,230 | B2 | 6/2010  | Bourne |
| 8,131,643 | B2 | 3/2012  | Battaglini |
| 8,510,168 | B2 | 8/2013  | Pitsch |
| 8,832,178 | B2 | 9/2014  | Lovisa |
| 9,005,929 | B2 | 4/2015  | Ronaghi |
| 9,292,904 | B2 | 3/2016  | Ruggiero |
| 9,373,283 | B2 | 6/2016  | Zhou |

(Continued)

FOREIGN PATENT DOCUMENTS

CA       2805960 A1 * 8/2013 ............. G06F 21/00

*Primary Examiner* — Khanh Q Dinh
(74) *Attorney, Agent, or Firm* — Moore & Van Allen PLLC; Anup Shrinivasan Iyer

(57) ABSTRACT

Systems, computer program products, and methods are described herein for implementing dynamic multi-factor soft lock on user identifiers. The present invention is configured to receive, from a first user input device, a network registration request from a user to obtain authorization to execute resource transfers within a distributed network using a first user identifier; query, using an information retrieval engine, metadata associated with the user within the distributed network for traceable instances of digital activities of the user; determine one or more user identifiers based on at least the metadata associated with the user; execute, using an authentication subsystem, a soft lock on the one or more user identifiers; approve authorization for the user to execute the resource transfers within the distributed network using the first user identifier; and transmit control signals configured to cause the first user device to display the authorization.

17 Claims, 4 Drawing Sheets

(56) References Cited

U.S. PATENT DOCUMENTS

| | | | |
|---|---|---|---|
| 9,674,310 B2 | 6/2017 | Hershko | |
| 9,715,660 B2 | 7/2017 | Parada San Martin | |
| 9,754,209 B1 | 9/2017 | Kronrod | |
| 9,792,062 B2 | 10/2017 | Kruglick | |
| 10,083,199 B1* | 9/2018 | Sharma | G06F 16/2365 |
| 10,219,179 B2 | 2/2019 | Gerdes | |
| 10,292,078 B1 | 5/2019 | Wu | |
| 10,318,850 B1* | 6/2019 | Gosalia | G06K 13/085 |
| 10,362,629 B2 | 7/2019 | Hellman | |
| 10,949,795 B1 | 3/2021 | Kolls et al. | |
| 11,007,979 B1* | 5/2021 | Mitchell | B60R 25/33 |
| 11,170,102 B1* | 11/2021 | Bhattacharya | G06F 21/6254 |
| 2013/0165117 A1* | 6/2013 | Narayanan | H04W 12/06 455/435.1 |
| 2014/0302817 A1* | 10/2014 | Govindhasamy | H04W 8/245 455/411 |
| 2015/0116106 A1* | 4/2015 | Fadell | G06Q 10/0631 340/501 |
| 2015/0127712 A1* | 5/2015 | Fadell | H04L 12/2807 709/202 |
| 2015/0129598 A1* | 5/2015 | Rogers | B65D 25/24 220/574 |
| 2015/0145643 A1* | 5/2015 | Fadell | G08B 29/185 340/5.51 |
| 2015/0154850 A1* | 6/2015 | Fadell | G06Q 10/083 340/501 |
| 2015/0159112 A1* | 6/2015 | Strandell | F16N 9/00 508/110 |
| 2015/0166107 A1* | 6/2015 | Delord | B62D 21/02 296/187.09 |
| 2015/0166108 A1* | 6/2015 | Persson | B62D 25/088 296/187.09 |
| 2017/0085563 A1* | 3/2017 | Royyuru | G06Q 20/12 |
| 2018/0300351 A1* | 10/2018 | Glover | G06F 9/44526 |
| 2019/0182105 A1* | 6/2019 | Stephens | H04L 67/535 |
| 2021/0008763 A1* | 1/2021 | Gnam | B29C 48/278 |

* cited by examiner

SYSTEM FOR IMPLEMENTING DYNAMIC MULTI-FACTOR SOFT LOCK ON USER IDENTIFIERS

FIELD OF THE INVENTION

The present invention embraces a system for implementing dynamic multi-factor soft lock on user identifiers.

BACKGROUND

In recent years, peer-to-peer (P2P) resource transfers have developed to describe a new way of exchanging resources without relying on traditional intermediaries. As more users and/or entities adopt P2P resource transfer systems, the potential for exposure increases. Therefore, there is a need for a system for implementing dynamic multi-factor soft lock on user identifiers in a distributed P2P network to reduce the likelihood that the user identifiers used to access the resources have not been misappropriated.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing dynamic multi-factor soft lock on user identifiers is presented. The system comprising: at least one non-transitory storage device; and at least one processor coupled to the at least one non-transitory storage device, wherein the at least one processor is configured to: electronically receive, from a first user input device, a first network registration request from a first user to obtain authorization to execute a first resource transfer within a distributed network using a first user identifier; query, using an information retrieval engine, metadata associated with the first user within the distributed network for traceable instances of digital activities of the first user; determine one or more user identifiers of the first user based on at least the metadata associated with the first user; execute, using an authentication subsystem, a soft lock on the one or more user identifiers; and authorize the first network registration request for the first user, wherein authorizing further comprises allowing first user to execute the first resource transfer within the distributed network using the first user identifier.

In some embodiments, authorizing the network registration request further comprises: transmitting an authorization code to the first user input device; displaying an authentication prompt on the first user input device for an authorization code input; receiving, from the first user input device, the authorization code input; determining that the authorization code matches the authorization code input; and authorizing the first network registration request for the first user.

In some embodiments, the at least one processor is further configured to: receive, from a second user input device, the authorization code input; determine a geolocation information associated with the second user input device; retrieve a geolocation information associated with the first user input device; determine that the geolocation information associated with the second user input device matches the geolocation information associated with the first user input device; and in response, authorize the first network registration request for the first user.

In some embodiments, the at least one processor is further configured to: determine that the geolocation information associated with the second user input device does not match the geolocation information associated with the first user input device; generate a first alert notification indicating that the second user input device is attempting to input the authorization code input; and transmit control signals configured to cause the first user input device to display the first alert notification.

In some embodiments, the at least one processor is further configured to: deny the first network registration request for the first user, wherein denying further comprises denying the first user to execute the first resource transfer within the distributed network using the first user identifier.

In some embodiments, the at least one processor is further configured to: electronically receive, from a second user input device, a second network registration request from a second user to obtain authorization to execute a second resource transfer within the distributed network using a second user identifier; determine that the second user identifier is associated with the one or more user identifiers of the first user that have a soft lock thereon; and deny the second network registration request for the second user, wherein denying further comprises denying the second user to execute the second resource transfer within the distributed network using the second user identifier.

In some embodiments, the at least one processor is further configured to: generate a second alert notification comprising an indication that the second user input device has attempted to execute the second resource transfer using the second user identifier; and transmit control signals configured to cause the first user input device to display the second alert notification.

In another aspect, a computer program product for implementing dynamic multi-factor soft lock on user identifiers is presented. The computer program product comprising a non-transitory computer-readable medium comprising code causing an apparatus to: electronically receive, from a first user input device, a first network registration request from a first user to obtain authorization to execute a first resource transfer within a distributed network using a first user identifier; query, using an information retrieval engine, metadata associated with the first user within the distributed network for traceable instances of digital activities of the first user; determine one or more user identifiers of the first user based on at least the metadata associated with the first user; execute, using an authentication subsystem, a soft lock on the one or more user identifiers; and authorize the first network registration request for the first user, wherein authorizing further comprises allowing first user to execute the first resource transfer within the distributed network using the first user identifier.

In yet another aspect, a method for implementing dynamic multi-factor soft lock on user identifiers is presented. The method comprising: electronically receiving, from a first user input device, a first network registration request from a first user to obtain authorization to execute a first resource transfer within a distributed network using a first user identifier; querying, using an information retrieval engine, metadata associated with the first user within the distributed network for traceable instances of digital activities of the first user; determining one or more user identifiers of the first user based on at least the metadata associated with the first user; executing, using an authentication subsystem, a soft lock on the one or more user identifiers; and authorizing the first network registration request for the first user, wherein authorizing further comprises allowing first user to execute the first resource transfer within the distributed network using the first user identifier.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
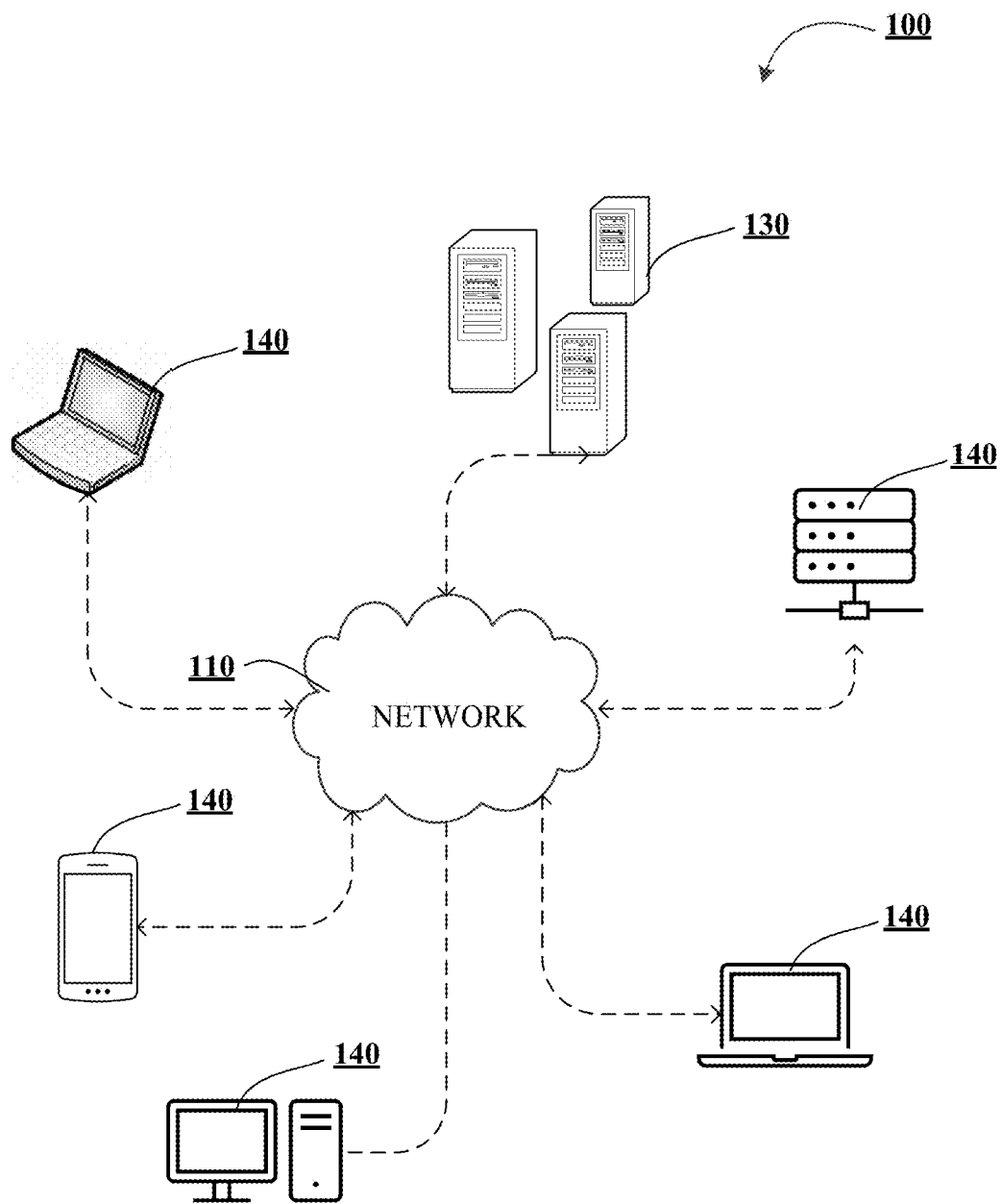
Figure 1B:
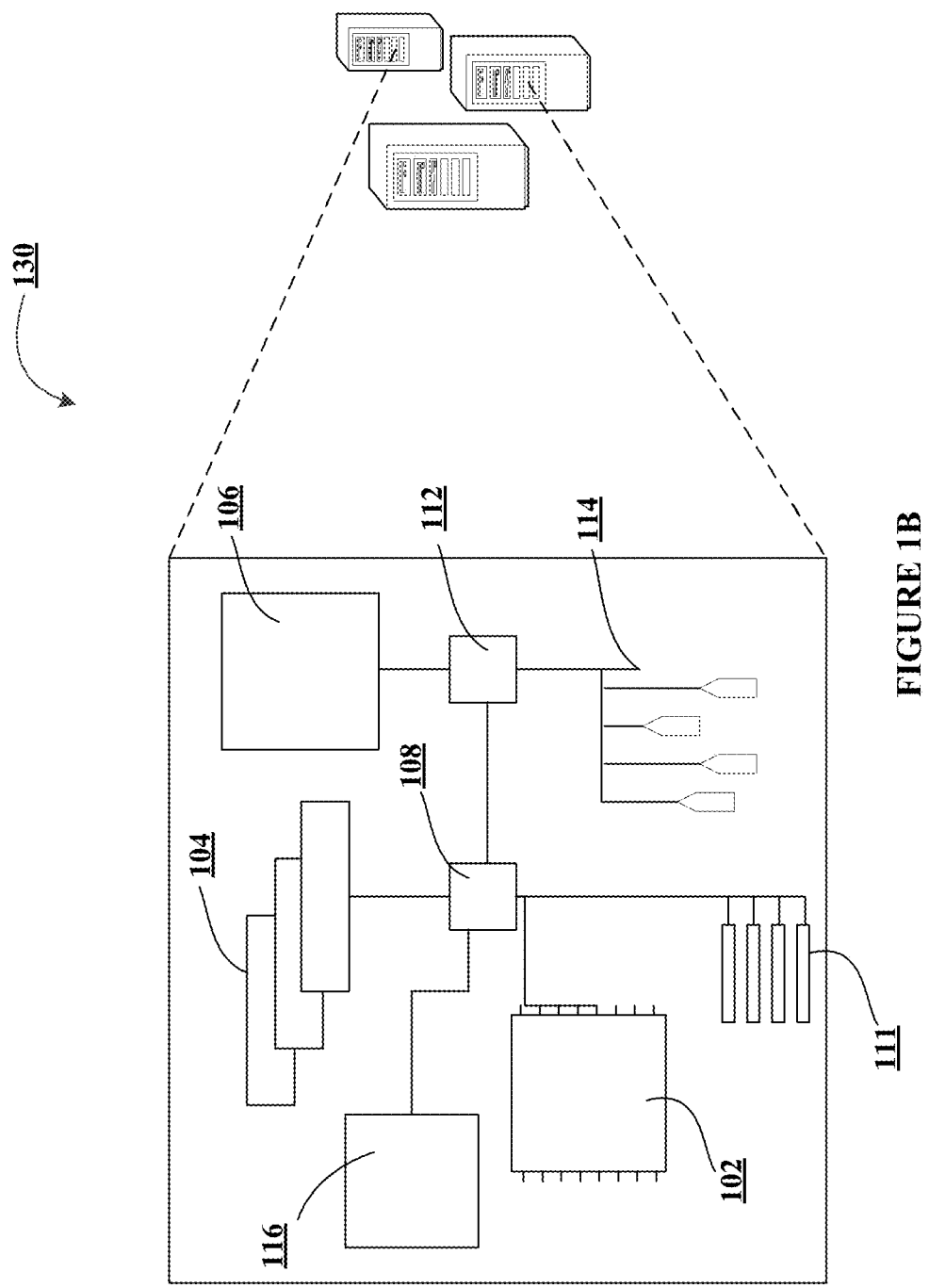
Figure 1C:
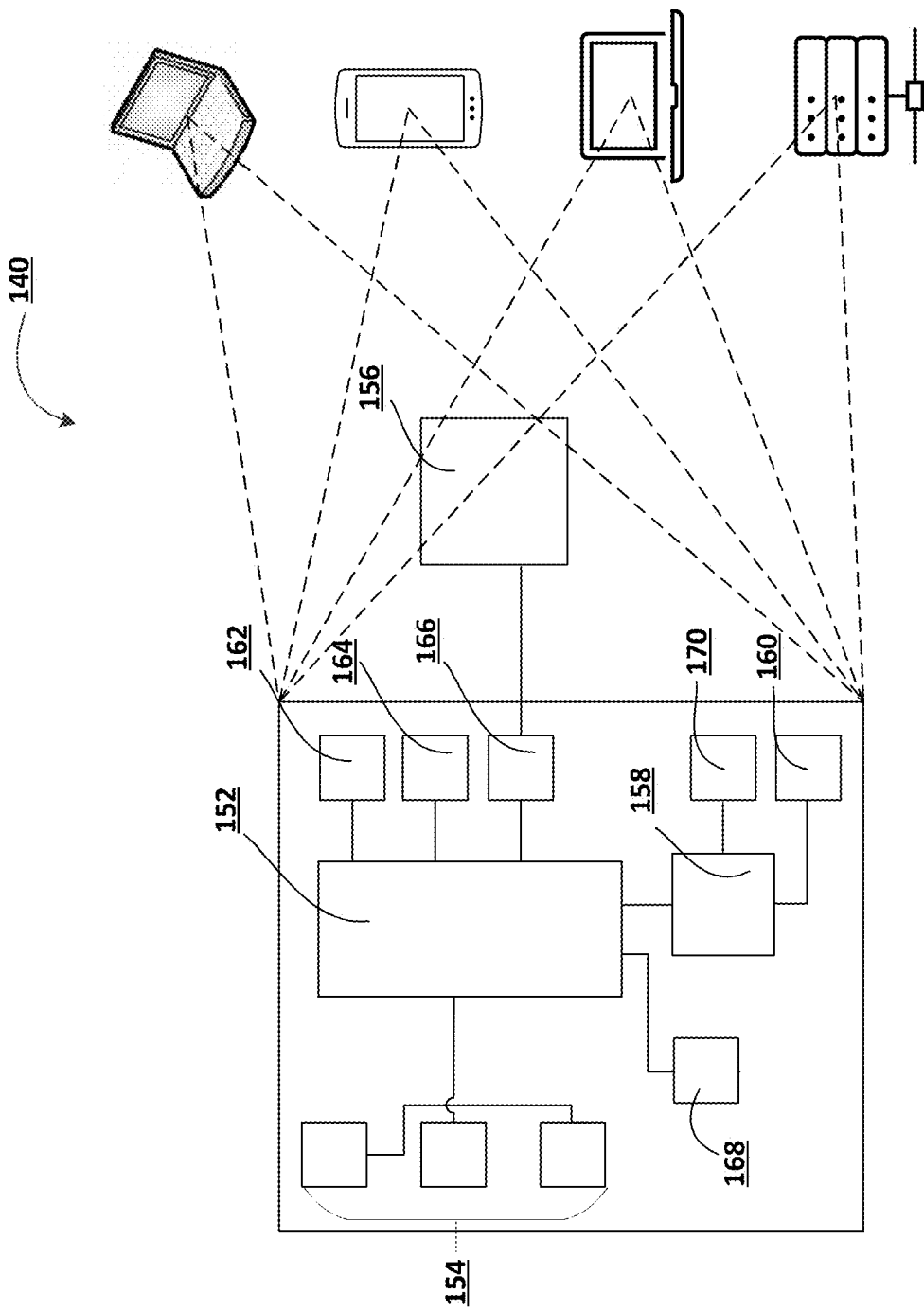
Figure 2:
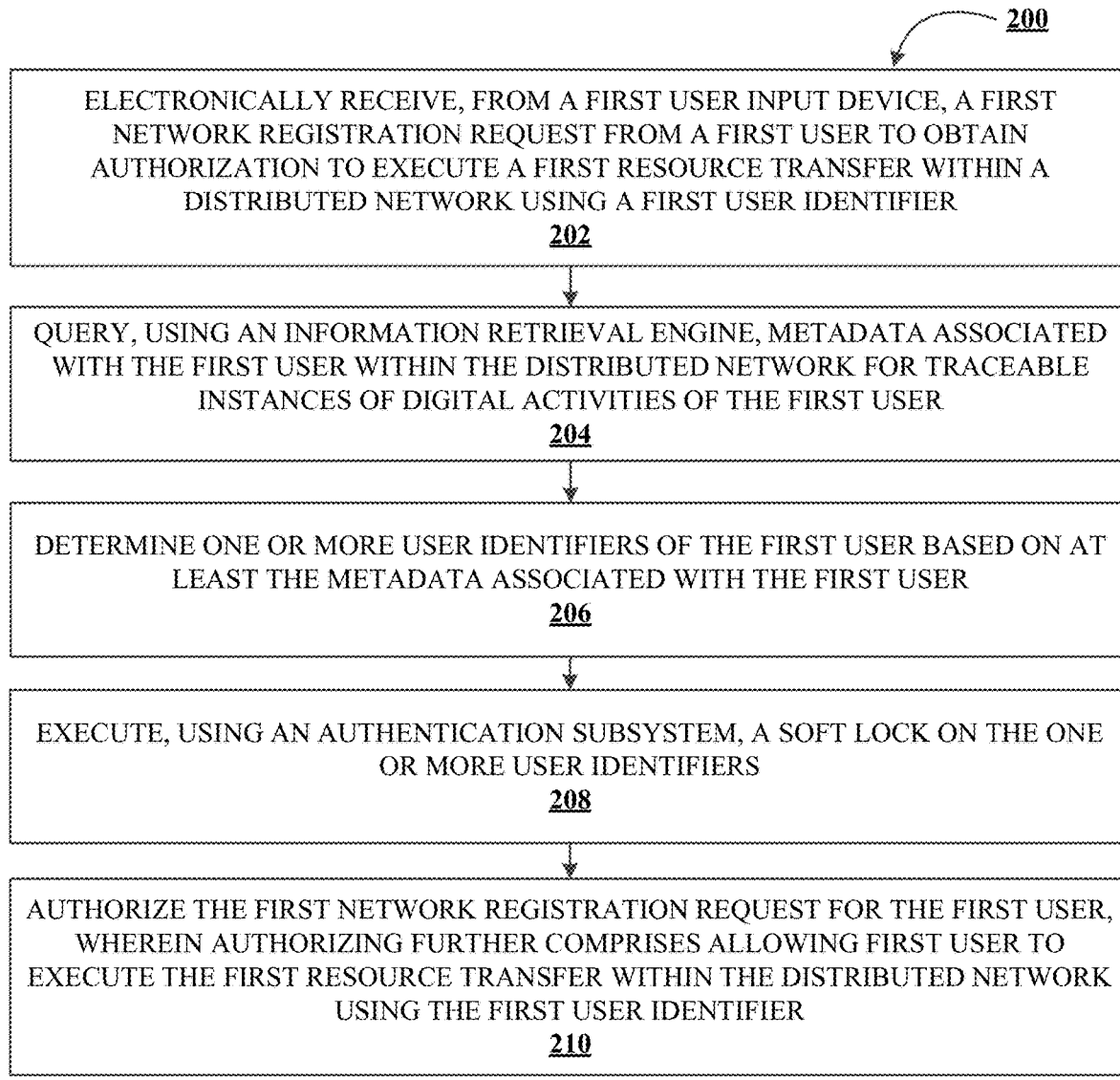

Having thus described embodiments of the invention in general terms, reference will now be made the accompanying drawings, wherein:

FIGS. 1A-1C illustrates technical components of an exemplary distributed computing environment for implementing dynamic multi-factor soft lock on user identifiers, in accordance with an embodiment of the invention;

FIG. 2 illustrates a process flow for implementing dynamic multi-factor soft lock on user identifiers, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user and/or an institution, including property that is stored and/or maintained by a third-party institution. In some example implementations, a resource may be associated with one or more accounts. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, "resource distribution account" may refer to a storage location identifiable by resource distribution account information where one or more resources are organized, stored, and retrieved electronically using a computing device. To execute a resource transfer between one or more entities, between one or more users, or between one or more users and one or more entities, each party may be associated with a resource distribution account. When a resource transfer is executed by a first party (e.g., a user), the resources of the first party may be retrieved from their dedicated resource distribution account and transferred to the resource distribution account of a second party (e.g., entity). Typically, a resource distribution account is maintained by the entity or other financial institutions.

As used herein, a "resource transfer" may refer to any transaction, activities, or communication between one or more entities, between one or more users, or between one or more users and one or more entities. A resource transfer may refer to any distribution of resources such as, but not limited to, a payment, processing of funds, purchase of goods or services, a return of goods or services, a payment transaction, a credit transaction, or other interactions involving a user's resource or a resource distribution account.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Typically, when users sign up to participate in P2P resource transfers, they may be required to submit a network registration request to register a user identifier that the user wishes to use to execute resource transfers. It is not uncommon for bad actors to use alternate user identifiers associated with the user to set up unauthorized, duplicate digital P2P resource transfer distribution accounts and misappropriate resources from the user. For an example, when a user signs up for P2P resource transfers, the user may use their email address as the user identifier to sign up for P2P resource transfer distribution account. Then a bad actor may use the user's phone number to set up an unauthorized, duplicate digital P2P resource transfer distribution account. The bad actor may get access to an authorization code and be able to act as the user in the P2P digital space. As such, when resources are being transferred to the user, it can actually be routed to the bad actor instead.

Accordingly, the present invention, (i) Receives, from a first user input device, a first network registration request from a first user to obtain authorization to execute a first resource transfer (e.g., P2P transactions) within a distributed network (e.g., P2P network) using a first user identifier. The first user identifier may be a numeric or alphanumeric string that is being presented by the user to be used as an authorized user identifier to execute the resource transfers, (ii) Queries, using an information retrieval engine, metadata associated with the first user within the distributed network for traceable instances of digital activities of the first user. For example, if the first user is a customer of the entity (e.g., financial institution), the first user has likely used multiple services and/or products provided by the entity in the past, and in doing so, left traces of digital activity within the distributed networks of the entity, (iii) Determines one or more user identifiers of the first user based on at least the metadata associated with the first user. Parses the metadata to identify various user identifiers used by the user to execute actions within the distributed network. The user identifiers may be publicly identifiable information (e.g., phone number, e-mail address, and/or the like) that is used to identify the user to one or more users within the distributed network, (iv) Executes, using an authentication subsystem, a soft lock on the one or more user identifiers. By implementing a soft lock on the user identifiers, the system may be configured to block the use of specific user identifiers to access the distributed network to execute resource transfers, and (v) Authorizes the first network registration request for the first user, wherein authorizing further comprises allowing first user to execute the first resource transfer within the distributed network using the first user identifier. Transmits an authorization code (e.g., onetime passcode (OTP)) to the first user input device. Displays an authentication prompt on the first user input device for an authorization code input. Receives, from the first user input device, the authorization code input. If the authorization code matches the authorization code input, the system may be configured to authorize the first network registration request for the first user. However, there may be instances where the authorization code is transmitted to the first user input device, but the authorization code input is received from a second user input device. In such cases, determines a geolocation information associated with the second user input device and the first user input device (registered previously to execute P2P resource transfers). If the geolocation information matches, then it is likely that the first user is using two different devices, but is indeed the first user, and in response authorize the first network registration request for the first user. If the geolocation does not match, alert the user via the first user input device that the second user input device is attempting to input the authentication code input. Any secondary network registration request that is received with a user identifier that is previously soft-lock is denied.

In this way, the present invention provides a technical solution to a technical problem. More specifically, the present invention provides a more accurate solution to problem of identifying duplicate misappropriation resource transfer accounts. This allows for reduced amount of computing resources, such as processing resources, storage resources, network resources, and/or the like, to be used to address the detrimental effects of bad actors using duplicate and unauthorized resource transfer accounts to misappropriate resources from a user. Furthermore, the present invention removes manual input and waste from the implementation of the solution, thus improving speed and efficiency of the process and conserving computing resource. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing dynamic multi-factor soft lock on user identifiers 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for implementing dynamic multi-factor soft lock on user identifiers 200, in accordance with an embodiment of the invention. As shown in block 202, the process flow includes electronically receiving, from a first user input device, a first network registration request from a first user to obtain authorization to execute a first resource transfer within a distributed network (e.g., P2P network) using a first user identifier. In some embodiments, the first resource transfer may include P2P digital payments, i.e., instant resource transfers that make it simple and secure to transact with friends, family, trusted businesses, and professionals without a dedicated payment instrument such as a card, or check, or traditional multi-step wire transfer process. In some embodiments, the first user identifier may be a numeric or alphanumeric string that is being presented by the first user to be used as an authorized user identifier to execute the first resource transfer (and any subsequent resource transfer within the distributed network).

Next, as shown in block 204, the process flow includes querying, using an information retrieval engine, metadata associated with the first user within the distributed network for traceable instances of digital activities of the first user. In some embodiments, the system may be configured to gather first user metadata, including structured and/or unstructured reference data used to sort and identify attributes of the information it describes, from various instances of digital activities of the first user across one or more distributed networks. For example, if the first user is a customer of the entity (e.g., financial institution), the first user has likely used multiple services and/or products provided by the entity in the past, and in doing so, left traces of digital activity within the distributed networks of the entity.

Next, as shown in block 206, the process flow includes determining one or more user identifiers of the first user based on at least the metadata associated with the first user. In this regard, the system may be configured to parse the metadata to identify various user identifiers used by the first user to execute actions within the distributed network. In some other embodiments, instead of using metadata to identify various user identifiers, the system may be configured to prompt the first user to provide additional user identifiers. In response, the system may be configured to receive, from the first user input device, the one or more user identifiers. As used herein, the user identifiers may be publicly identifiable information (e.g., phone number, e-mail address, business information, and/or the like) that is used to identify the first user to one or more users within the distributed network.

Next, as shown in block 208, the process flow includes executing, using an authentication subsystem, a soft lock on the one or more user identifiers. By implementing a soft lock on the user identifiers, the system may be configured to block any misappropriate use of user identifiers associated with the first user to be registered to access the distributed network to execute resource transfers by a third party (e.g., bad actor).

Next, as shown in block 210 the process flow includes authorizing the first network registration request for the first user, wherein authorizing further comprises allowing first user to execute the first resource transfer within the distributed network using the first user identifier. In this regard, the system may be configured to transmit an authorization code (e.g., onetime passcode (OTP)) to the first user input device. In response, the system may be configured to display an authentication prompt on the first user input device for an authorization code input. Then, the system may be configured to receive, from the first user input device, the authorization code input. In response to receiving the authorization code input, the system may be configured to determine whether the authorization code matches the authorization code input. If the authorization code matches the authorization code input, the system may be configured to authorize the first network registration request for the first user.

However, there may be instances where the authorization code is transmitted to the first user input device, but the authorization code input is received from a second user input device. In such instances, the system may be configured to determine a geolocation information associated with the second user input device (e.g., IP address). Then, the system may be configured to retrieve a geolocation information associated with the first user input device (e.g., using GPS information). If the geolocation information associated with the first user input device matches that of the second user input device, the system may be configured to authorize the first network registration request for the first user. On the other hand, if the geolocation information associated with the first user input device does not match that of the second user input device, the system may be configured to generate a first alert notification to the user indicating that the second user input device is attempting to input the authentication code input. In response, the system may be configured to transmit control signals configured to cause the first user input device to display the first alert notification. In some embodiments, the system may be configured to also deny the first network registration request for the first user.

In some embodiments, the system may be configured to electronically receive, from a second user input device, a second network registration request from a second user to obtain authorization to execute a second resource transfer within the distributed network using a second user identifier. In response, the system may be configured to determine that the second user identifier is associated with the one or more user identifiers of the first user that have a soft lock thereon. In such cases, the system may be configured to deny the second network registration request for the second user. In addition, the system may be configured to generate a second alert notification comprising an indication that the second user input device has attempted to execute the second resource transfer using the second user identifier. In response, the system may be configured to transmit control signals configured to cause the first user input device to display the second alert notification.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for implementing dynamic multi-factor soft lock on user identifiers, the system comprising:
    at least one non-transitory storage device; and
    at least one processor coupled to the at least one non-transitory storage device, wherein the at least one processor is configured to:
    electronically receive, from a first user input device, a first network registration request from a first user to obtain authorization to execute a first resource transfer within a distributed network using a first user identifier;
    query, using an information retrieval engine, metadata associated with the first user within the distributed network for traceable instances of digital activities of the first user;
    determine one or more user identifiers of the first user based on at least the metadata associated with the first user;
    execute, using an authentication subsystem, a soft lock on the one or more user identifiers; and
    authorize the first network registration request for the first user, wherein authorizing further comprises allowing first user to execute the first resource transfer within the distributed network using the first user identifier, wherein authorizing the first network registration request further comprises:
    transmitting an authorization code to the first user input device;
    receiving, from a second user input device, the authorization code input;
    determining a geolocation information associated with the second user input device;
    retrieving a geolocation information associated with the first user input device;
    determining that the geolocation information associated with the second user input device matches the geolocation information associated with the first user input device; and
    in response, authorizing the first network registration request for the first user.

2. The system of claim 1, wherein authorizing the network registration request further comprises:
    displaying an authentication prompt on the first user input device for an authorization code input;
    receiving, from the first user input device, the authorization code input;
    determining that the authorization code matches the authorization code input; and
    authorizing the first network registration request for the first user.

3. The system of claim 2, wherein the at least one processor is further configured to:
    determine that the geolocation information associated with the second user input device does not match the geolocation information associated with the first user input device;
    generate a first alert notification indicating that the second user input device is attempting to input the authorization code input; and
    transmit control signals configured to cause the first user input device to display the first alert notification.

4. The system of claim 3, wherein the at least one processor is further configured to:
    deny the first network registration request for the first user, wherein denying further comprises denying the first user to execute the first resource transfer within the distributed network using the first user identifier.

5. The system of claim 1, wherein the at least one processor is further configured to:
    electronically receive, from a second user input device, a second network registration request from a second user to obtain authorization to execute a second resource transfer within the distributed network using a second user identifier;
    determine that the second user identifier is associated with the one or more user identifiers of the first user that have a soft lock thereon; and
    deny the second network registration request for the second user, wherein denying further comprises denying the second user to execute the second resource transfer within the distributed network using the second user identifier.

6. The system of claim 5, wherein the at least one processor is further configured to:
    generate a second alert notification comprising an indication that the second user input device has attempted to execute the second resource transfer using the second user identifier; and
    transmit control signals configured to cause the first user input device to display the second alert notification.

7. A computer program product for implementing dynamic multi-factor soft lock on user identifiers, the computer program product comprising a non-transitory computer-readable medium comprising code causing an apparatus to:
    electronically receive, from a first user input device, a first network registration request from a first user to obtain authorization to execute a first resource transfer within a distributed network using a first user identifier;
    query, using an information retrieval engine, metadata associated with the first user within the distributed network for traceable instances of digital activities of the first user;
    determine one or more user identifiers of the first user based on at least the metadata associated with the first user;

execute, using an authentication subsystem, a soft lock on the one or more user identifiers; and authorize the first network registration request for the first user, wherein authorizing further comprises allowing first user to execute the first resource transfer within the distributed network using the first user identifier, wherein authorizing the first network registration request further comprises:
- transmitting an authorization code to the first user input device;
- receiving, from a second user input device, the authorization code input;
- determining a geolocation information associated with the second user input device;
- retrieving a geolocation information associated with the first user input device;
- determining that the geolocation information associated with the second user input device matches the geolocation information associated with the first user input device; and
- in response, authorizing the first network registration request for the first user.

8. The computer program product of claim 7, wherein authorizing the network registration request further comprises:
- displaying an authentication prompt on the first user input device for an authorization code input;
- receiving, from the first user input device, the authorization code input;
- determining that the authorization code matches the authorization code input; and
- authorizing the first network registration request for the first user.

9. The computer program product of claim 8, wherein the apparatus is further configured to:
- determine that the geolocation information associated with the second user input device does not match the geolocation information associated with the first user input device;
- generate a first alert notification indicating that the second user input device is attempting to input the authorization code input; and
- transmit control signals configured to cause the first user input device to display the first alert notification.

10. The computer program product of claim 9, wherein the apparatus is further configured to:
- deny the first network registration request for the first user, wherein denying further comprises denying the first user to execute the first resource transfer within the distributed network using the first user identifier.

11. The computer program product of claim 7, wherein the apparatus is further configured to:
- electronically receive, from a second user input device, a second network registration request from a second user to obtain authorization to execute a second resource transfer within the distributed network using a second user identifier;
- determine that the second user identifier is associated with the one or more user identifiers of the first user that have a soft lock thereon; and
- deny the second network registration request for the second user, wherein denying further comprises denying the second user to execute the second resource transfer within the distributed network using the second user identifier.

12. The computer program product of claim 11, wherein the apparatus is further configured to:
- generate a second alert notification comprising an indication that the second user input device has attempted to execute the second resource transfer using the second user identifier; and transmit control signals configured to cause the first user input device to display the second alert notification.

13. A method for implementing dynamic multi-factor soft lock on user identifiers, the method comprising:
- electronically receiving, from a first user input device, a first network registration request from a first user to obtain authorization to execute a first resource transfer within a distributed network using a first user identifier;
- querying, using an information retrieval engine, metadata associated with the first user within the distributed network for traceable instances of digital activities of the first user;
- determining one or more user identifiers of the first user based on at least the metadata associated with the first user;
- executing, using an authentication subsystem, a soft lock on the one or more user identifiers; and
- authorizing the first network registration request for the first user, wherein authorizing further comprises allowing first user to execute the first resource transfer within the distributed network using the first user identifier, wherein authorizing the first network registration request further comprises:
  - transmitting an authorization code to the first user input device;
  - receiving, from a second user input device, the authorization code input;
  - determining a geolocation information associated with the second user input device;
  - retrieving a geolocation information associated with the first user input device;
  - determining that the geolocation information associated with the second user input device matches the geolocation information associated with the first user input device; and
  - in response, authorizing the first network registration request for the first user.

14. The method of claim 13, wherein authorizing the network registration request further comprises:
- displaying an authentication prompt on the first user input device for an authorization code input;
- receiving, from the first user input device, the authorization code input;
- determining that the authorization code matches the authorization code input; and
- authorizing the first network registration request for the first user.

15. The method of claim 14, wherein the method further comprises:
- determining that the geolocation information associated with the second user input device does not match the geolocation information associated with the first user input device;
- generating a first alert notification indicating that the second user input device is attempting to input the authorization code input; and
- transmitting control signals configured to cause the first user input device to display the first alert notification.

16. The method of claim 15, wherein the method further comprises:

denying the first network registration request for the first user, wherein denying further comprises denying the first user to execute the first resource transfer within the distributed network using the first user identifier.

17. The method of claim 13, wherein the method further comprises:

electronically receiving, from a second user input device, a second network registration request from a second user to obtain authorization to execute a second resource transfer within the distributed network using a second user identifier;

determining that the second user identifier is associated with the one or more user identifiers of the first user that have a soft lock thereon; and denying the second network registration request for the second user, wherein denying further comprises denying the second user to execute the second resource transfer within the distributed network using the second user identifier.

\* \* \* \* \*